Patented Oct. 10, 1950

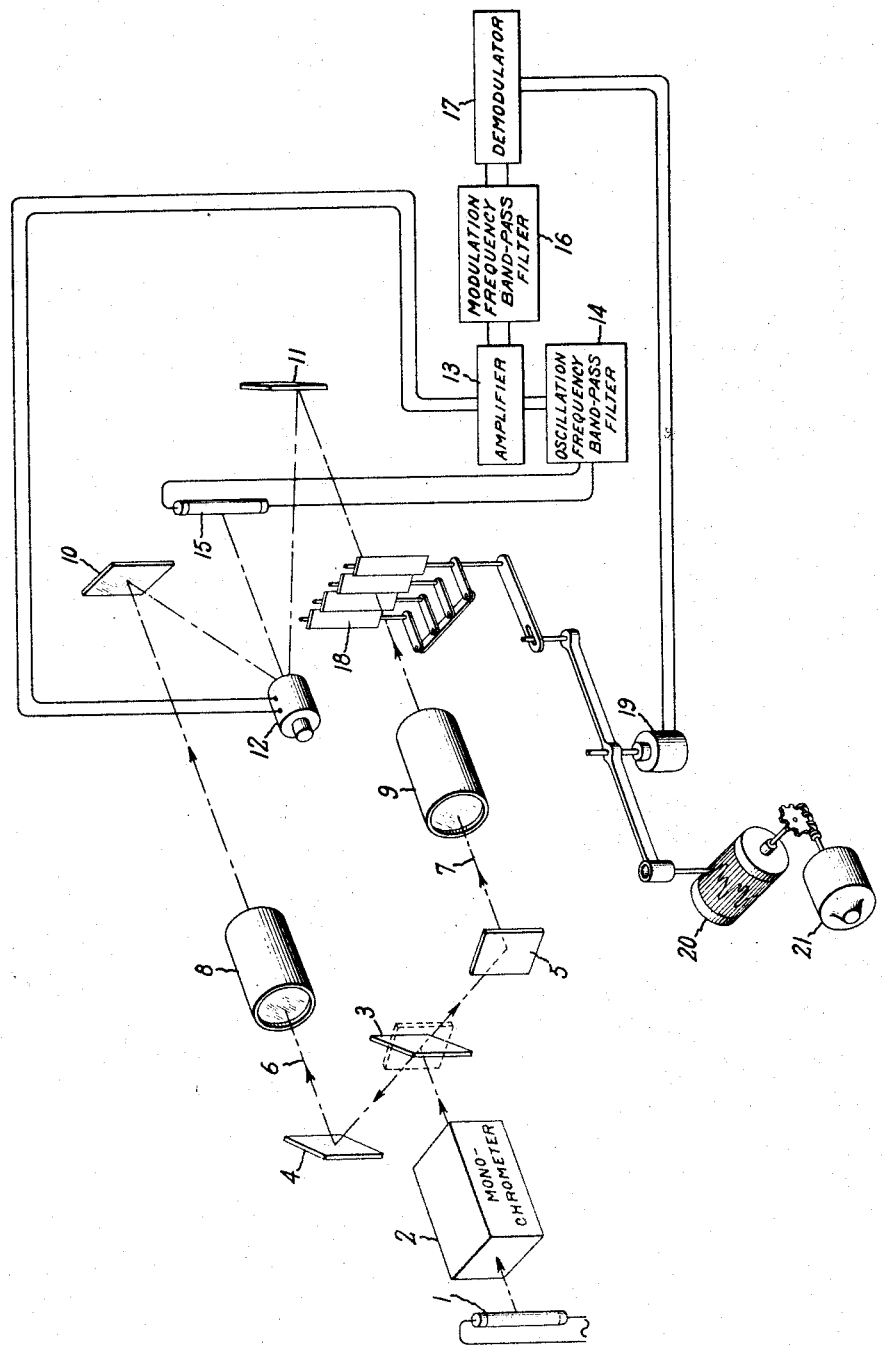

2,525,445

UNITED STATES PATENT OFFICE 2,525,445

PHOTOMETER

Alfred H. Canada, Schenectady, N. Y., assignor to General Electric Company, a corporation of New York Application November 10, 1949, Serial No. 126,646

2 Claims. (Cl. 250—217)

My invention relates to photometers and, particularly, to an improved photometer of a type adapted to compare characteristics of two substances by measuring the relative amounts of monochromatic light transmitted by the two substances at one or more wave lengths.

In photometers, as well as in other optical measuring apparatus, it is frequently the practice to use modulated light, that is, light which is interrupted at a predetermined frequency, which then performs its measurement function and is demodulated to give the desired measurement. The chief objective satisfied by the use of modulated light is that the effects of stray unmodulated light are practically eliminated. In comparison photometers of the type above described, it is frequently the practice to direct the modulated light alternately to two substances to be optically compared at what may be conveniently designated as the oscillation frequency.

In certain photometers, the desired monochromatic light for testing is obtained by passing the illumination from a suitable source such as lamp through a device called a monochromator. The monochromator may also serve to modulate the light at a desired frequency. In certain of such monochromators, for instance, in the Golay Multiple Slit Monochromator which is described in the Journal of the Optical Society of America, volume 39, pages 437 to 444, a large amount of unmodulated polychromatic light is emitted in addition to the desired monochromatic modulated light signal. The unmodulated polychromatic light is undesired, since the optical comparison test is to be made with the monochromatic light only, and if this polychromatic signal is transmitted through the photometer system to the photometer detector, the detector is overloaded and is thereby rendered less sensitive to the desired monochromatic test signal.

It is, therefore, an object of my invention to eliminate the optical signal derived from the polycromatic unmodulated light which is emitted from a monochromator without decreasing the sensitivity of the photometer.

In such photometers as above described, the entire output of the monochromator is directed alternately to the two substances to be optically compared at the oscillation frequency. The signals received at the photometer detector are, therefore, of the oscillation frequency, the previously unmodulated polychromatic light having the oscillation frequency only and the monochromatic modulated light having, in addition to the oscillation frequency, the modulation frequency. My invention, therefore, consists essentially of a photometer incorporating auxiliary apparatus for recognizing the oscillation frequency signals received by the photometer detector and for generating a light signal which varies in intensity at the oscillation frequency in response to the signal, the light being supplied to the detector in reverse phase to cancel out the polycromatic oscillation frequency signal.

The features of my invention which I believe to be novel and patentable are pointed out in the claims appended hereto. For a better understanding of my invention, reference is made in the following description to the accompanying drawing in which the single figure schematically illustrates the photometer of this invention.

Referring to the drawing, a light source 1 is shown which may be adapted to emit visible light, infra-red light, or ultra-violet light, as desired. The light from source 1 is supplied to a monochromator 2 which, in the photometer system of my invention, transmits a portion of the light from source 1, which is of a single desired wave length hereinafter designated monochromatic, which is intermittent or modulated at a desired frequency. This monochromator also emits a large amount of light of a number of undesired wave lengths hereinafter designated polychromatic, which is unmodulated. This undesired, unmodulated light is many times more powerful than the desired monocromatic modulated light.

A pivoted reflector 3, which oscillates at a frequency different from the modulation frequency, intercepts the light emitted from the monochromator, directing it to reflector 4 when in the position shown and to reflector 5 when in its other position indicated with dotted lines. The light directed to reflector 4 is designated as beam 6 and that directed to reflector 5 as beam 7. Beam 6 is directed from reflector 4 through an enclosure or cell containing a material to be optically tested, and beam 7 is directed through a standard cell 9 containing a material of known optical properties with which the material in cell 8 is to be compared.

When the beams 6 and 7 emerge from cells 8 and 9, they are respectively reflected by reflecting surfaces 10 and 11 to strike a radiation detector 12. Light reaches detector 12 from each beam alternately as reflector 3 alternately reflects beams 6 and 7. If equal amounts of light arrive alternately by each of the two paths, the energy received at detector 12 is constant in value; but if more energy arrives by one path than by the other, there will be an alternating component in the energy received at the detector of the frequency at which the reflector 3 oscillates, and a phase dependent upon which path transmits the greater amount of light. Detector 12, which may be a bolometer, thermopile, or other sensitive radiation detector, provides an output electric signal which is amplified by a phase sensitive amplifier 13 which may be of conventional construction.

Since monochromator 2 transmits modulated light of a desired wave length and also polychromatic light which is unmodulated, the oscillating reflector 3 transmits both of these kinds of light through both sample cell 8 and standard cell 9. However, the measurement which is desired is to be made only with the modulated monochromatic light. The signal which it is desired to detect then is the difference in the amounts of monochromatic modulated light which is transmitted through the sample cell 8 and the standard cell 9. This signal will have a frequency corresponding to the modulation frequency of the monochromator, plus the superimposed frequency of oscillation of reflector 3, which will hereinafter be designated as the oscillation frequency. The polychromatic light re-emitted by the monochromator also is transmitted through each of the two paths at the oscillation frequency and constitutes part of the signal received by detector 12. All of the signals received by detector 12 are conveyed to an amplifier 13. The output circuit from amplifier 13 is connected to a band-pass filter 14 which may be a conventional filter circuit designed to pass the oscillation frequency only. Connected to the output terminals of this filter is a light source 15, which may be of the same type as light source 1, but which is energized from filter 14. The signal derived from the polychromatic oscillation frequency light which strikes detector 12, passes through amplifier 13, filter 14, and energizes light source 15 in a reverse phase relationship from the original polychromatic light signal striking detector 12. The resulting light which emanates from light source 15 therefore strikes detector 12 with such a phase and amplitude as to cancel out the effect of the original polychromatic light signal.

The modulated monochromatic light signal which is received by detector 12 is not passed by band-pass filter 14 since this signal is of the modulation frequency, but is passed by a band-pass filter 16 into a demodulator circuit 17. Filter 16 does not pass the polychromatic oscillation frequency signal, and thus, only the desired measurement signal is received at demodulator 17.

The demodulator 17 may be connected to a light attenuator 18 which is positioned in the path of the light beam 7 between standard cell 9 and reflector 11. This connection is made through an attenuator positioning motor 19. The degree of attenuation effected by attenuator 18 is a function of the angle at which the attenuator blades are tilted. In the photometer which I prefer to use, the comparison between the amount of test light transmitted by the sample cell and the standard cell is accomplished in terms of a measurement of the amount of attenuation which must be applied to the light transmitted by the standard cell in order to exactly balance the two optical signals at detector 12. Any unbalance signal received by demodulator 17, therefore, is transmitted to attenuator positioning motor 19 in order to position the attenuator to balance out the unbalance signal. A conventional recorder mechanism 20 is used which may have a uniform speed drive motor 21, and the stylus of this recorder is positioned in accordance with the movement of attenuator 18 to furnish a record of the photometer comparison measurement.

In accordance with the provisions of the patent statutes, I have described the principle of my invention, together with the apparatus which I now consider to represent the best embodiment thereof; but I wish it to be understood that the apparatus described is illustrative only, and that the invention can be carried out by other means.

What I claim as new and desire to secure by Letters Patent of the United States is:

1. In a comparison photometer, a source of test light including a monochromator which is adapted to emit a modulated monochromatic light signal and an unmodulated polychromatic light signal, a sample cell, a standard cell, a light sensitive device, and means for intermittently directing said light signals through said sample cell and through said standard cell to said light sensitive device at an oscillation frequency, amplifying means for amplifying the signals received by said device, an oscillation frequency band-pass filter energized from said amplifier and a light generator energized from said oscillation frequency band-pass filter which is adapted to generate an optical signal of oscillation frequency to cancel out the oscillation frequency signal derived from the unmodulated polychromatic light emitted from said monochromator.

2. A photometer including a light source, a monochromator for dividing the illumination from said light source into monochromatic light modulated at a modulation frequency and unmodulated polychromatic light, a sample to be optically tested and a standard with which said sample is to be optically compared, a photometer detector, and reflecting means oscillatable at a desired frequency to alternately direct the illumination emitted from said monochromator through said sample to said detector and through said standard to said detector, said detector being adapted to receive both the optical signals resulting from the monochromatic modulated light and from the unmodulated polychromatic light emitted by said monochromator, means for amplifying the signals received by said detector, an oscillation frequency band-pass filter adapted to pass the oscillation frequency signal resulting from the polychromatic unmodulated light emitted by said monochromator while furnishing a high impedance path for said modulation frequency signal, light generating means adapted to be energized from said oscillation frequency band-pass filter to further illuminate said detector with light that varies in intensity at the oscillation frequency and of reverse phase relationship to said oscillation frequency signal to cancel out said signal.

ALFRED H. CANADA.

REFERENCES CITED

The following references are of record in the file of this patent:

UNITED STATES PATENTS

| Number | Name | Date |
| --- | --- | --- |
| 1,919,182 | Fitzgerald | July 18, 1933 |
| 1,985,683 | Nicolson | Dec. 25, 1934 |
| 2,193,789 | Braselton | Mar. 19, 1940 |